Patented Apr. 4, 1950

2,503,206

UNITED STATES PATENT OFFICE 2,503,206

3,6-EPOXY-1,2,3,6-TETRAHYDRO-PHTHALONITRILES

David T. Mowry, Dayton, Ohio, assignor to Monsanto Chemical Company, St. Louis, Mo., a corporation of Delaware No Drawing. Application June 26, 1947,
Serial No. 757,335

4 Claims. (Cl. 260—345)

This invention provides as new products compounds having the formula:

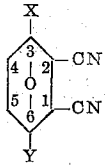

where X and Y are selected, respectively, from the groups: H and H; H and —CH₃; H and —CH₂OCOCH₃; and —CH₃ and —CH₃. The present compounds have been found to possess fungistatic activity in an exceptional degree.

In order to protect materials against damage by fungus growths, the herein-disclosed compounds may be dissolved in a suitable solvent such as benzene or toluene to form dilute (1% to 5%) solutions thereof and then sprayed upon the material to be protected. In this manner, cotton textiles, paper, wood, jute, or other materials subject to growth of fungus organisms may be protected against damage thereby. If desired, the material to be treated may also be impregnated by immersion in suitable solutions of the present compounds.

The preparation of the present compounds is best carried out by mixing together equal molar proportions of fumarodinitrile with a compound having the formula:

where X and Y are selected, respectively, from the groups: H and H; H and —CH₃; H and —CH₂OCOCH₃; and —CH₃ and —CH₃. The reaction may be carried out in a dioxane solution of the reactants at a temperature between room temperature (25° C.) and about 40° C. The solution of dioxane containing the above reactants is allowed to stand for several days and the condensation product therein formed is then recovered by precipitation by the addition of hexane or by distillation. The product obtained may be purified by recrystallization if desired.

While the process is conveniently carried out in a dioxane solution, it is possible to use other solvents such as benzene, ether, alcohol, etc. It is also possible to employ an excess of the liquid furan or furan derivative itself as a solvent in which to carry out the condensation.

The following examples illustrate this invention.

Example 1

*3,6-epoxy - 1,2,3,6-tetrahydrophthalonitrile.*—One-half mole portions of fumaronitrile (39 g.) and furan (34 g.) in 150 cc. of dioxane were heated at 40° in a closed container for two days. After cooling to room temperature, sufficient hexane was added to make the solution barely turbid and 18 g. (25% yield) of product, M. P. 111° (sealed tube), slowly precipitated in five days' time. A second crop of 12 g., M. P. 81–88° proved to be largely fumaronitrile and a third oily fraction was a mixture of the reagent and product. Cautious recrystallization from benzene and hexane did not raise the melting point.

A small sample was heated at 115° in an oil bath and the decomposition products identified as a fluid liquid, B. P. 31.5° (furan has B. P. 32°) and a solid M. P. 96° which was not depressed by mixing with fumaronitrile.

Less satisfactory results were obtained when the reaction was run in a mixture of benzene and ether at room temperature in benzene solution at 70° C.

Example 2

*3-methyl-3,6-epoxy-1,2,3,6-tetrahydrophthalonitrile.*—One-half mole portions of fumaronitrile (39 g.) and sylvan (41 g.) were allowed to stand for five days in 200 cc. of dioxane. The product was precipitated by pouring into water and the crude product was recrystallized three times from dilute ethanol to give 16 g. (20%) of the pure adduct, M. P. 100°.

Attempts to run the reaction in a benzene or a benzene-ethanol mixture and to purify the product by recrystallization from benzene and hexane gave inferior results.

Example 3

*3,6 - dimethyl-3,6-epoxy-1,2,3,6 - tetrahydrophthalonitrile.*—One mole portions of fumaronitrile (78 g.) and 2,5-dimethylfuran (96 g) in 150 cc. of dioxane were allowed to stand for three weeks at room temperature. The solvent was removed at reduced pressures. The residue was recrystallized from dilute ethanol and 82 g. of a crude fraction, M. P. 57–64°, was obtained. Recrystallization gave 10 g. impure reagent, M. P. 51–56° in the first crop and 42 g. (24% yield) of the adduct, M. P. 70–71°, in the second crop. The analytical sample after two more recrystallizations melted at 72°.

Example 4

*3-acetoxymethyl - 3,6-epoxy-1,2,3,6-tetrahydrophthalonitrile.*—One mole portions of fumaronitrile (78 g.) and furfuryl acetate (140 g.) in 150 cc. of dioxane were allowed to stand for ten days. The solvent was evaporated under reduced pressure and a crop (38 g.) of crystals was obtained by cooling and filtering. The operation was repeated twice on the mother liquor and two additional crops of crystals obtained. The first and third crops (54 g., 23% yield) M. P. 106–108° were the desired product, while the second crop (44 g., M. P. 94–97°) were proved to be largely unreacted fumaronitrile. Two more recrystallizations from dilute ethanol raised the melting point to 113°.

The above compounds, when tested as germicidal agents by the standard FDA test, showed no outstanding ability to kill the organism *Staph. aureus*.

The fungistatic value of these compounds was established in the following manner:

To a quantity of hot malt agar sufficient of the product of Example 2 above was added so as to produce a concentration therein of 0.005% by weight. Petri plates were then poured and the agar allowed to harden therein. The plates were then sprayed upon the agar surface with *Aspergillus niger* and then incubated at 28° C. for five days. The test plates showed no evidence of growth of organism after incubation.

What I claim is:

1. Compounds having the formula:

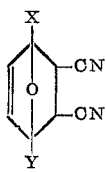

where X and Y are selected, respectively, from the groups: H and H; H and —$CH_3$; H and —$CH_2OCOCH_3$ and —$CH_3$ and —$CH_3$.

2. The compound having the formula:

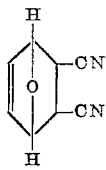

melting when pure, at 111° C.

3. The compound having the formula:

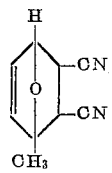

melting when pure, at 100° C.

4. The compound having the formula:

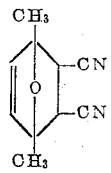

melting when pure, at 72° C.

DAVID T. MOWRY.

REFERENCES CITED

The following references are of record in the file of this patent:

UNITED STATES PATENTS

| Number | Name | Date |
|---|---|---|
| 1,944,731 | Diels et al. | Jan. 23, 1934 |

OTHER REFERENCES

Ann. Repts. Progress of Chem., vol. 42 (1945), p. 159.

Lowy et al., Int. to Organic Chemistry, p. 381, 6th edition, 1946.

Frear, A Catalogue of Insecticides and Fungicides (1947), vol. I, p. 143.

Blomquist et al., J. of Organic Chem., vol. 10, March 1945, page 150.